United States Patent [19]
Simkins

[11] Patent Number: 5,516,132
[45] Date of Patent: May 14, 1996

[54] VARIABLE-SPEED TRANSMISSION

[76] Inventor: Barry A. Simkins, 19255 Raineri La., Los Gatos, Calif. 95030

[21] Appl. No.: 278,917

[22] Filed: Jul. 22, 1994

[51] Int. Cl.⁶ .................................................. B62M 11/00
[52] U.S. Cl. ........................ 280/236; 280/238; 280/259; 475/170; 74/117
[58] Field of Search ...................... 280/259, 260, 280/236, 238; 74/117, 119, 125.5; 475/170, 335

[56] References Cited

U.S. PATENT DOCUMENTS

| | | |
|---|---|---|
| 3,359,813 | 12/1967 | Okano ........................................ 74/117 |
| 3,892,139 | 7/1975 | Harris ..................................... 74/117 X |
| 3,899,941 | 7/1975 | Cook . |
| 3,995,709 | 9/1975 | Gil . |
| 4,127,038 | 8/1976 | Browning . |
| 4,164,153 | 8/1979 | Moritsch et al. ................... 280/236 X |
| 4,235,125 | 2/1979 | Perlin . |
| 4,373,926 | 7/1980 | Fullerton . |
| 4,435,997 | 9/1981 | van Doorne et al. . |
| 4,644,828 | 2/1987 | Kozakae .................................. 74/117 X |
| 4,712,450 | 12/1987 | Takamiya et al. ....................... 475/170 |
| 4,741,546 | 5/1988 | Reswick . |
| 4,836,046 | 6/1989 | Chappel ............................... 280/236 X |
| 4,857,035 | 8/1989 | Anderson . |
| 4,913,002 | 4/1990 | Fellows . |
| 4,983,151 | 1/1991 | Pires . |
| 5,024,637 | 6/1991 | Guichard . |
| 5,454,766 | 10/1995 | Mills ................................... 280/238 X |

FOREIGN PATENT DOCUMENTS

| | | | |
|---|---|---|---|
| 1295-107 | 3/1987 | U.S.S.R. ..................................... 74/117 |
| 386138 | 1/1933 | United Kingdom ..................... 74/117 |

Primary Examiner—Mitchell J. Hill
Assistant Examiner—Victor E. Johnson
Attorney, Agent, or Firm—Paul D. Grossman; Peter J. Dehlinger

[57] ABSTRACT

The invention is a variable mechanical transmission for converting a rotary input into a rotary output. The transmission includes a spindle for mounting, allowing for rotation in response to the rotary input, a hub mounted on the spindle for rotation therewith, and a plurality of elongate arms. The arms are each pivotally mounted on the hub, with the pivoting axes of the arms being arranged about the spindle axis. Each arm carries at its outer end a clutched pinion which rotates in one direction only. The pinions engage the teeth of a gear. The gear is mountable on a frame for rotation about a gear axis paralleling the spindle axis and also for movement on a frame between concentric and extreme eccentric positions, at which the gear axis has a minimal and maximal displacement, respectively, from the hub axis. Also included in the transmission is shifting structure operable to shift the gear from its concentric toward its extreme eccentric position, and rotary output means coupled to the gear for rotation therewith about the gear axis, for producing a rotary output. The shifting structure may be controlled by an operator or shift responsively to a load on the transmission.

20 Claims, 9 Drawing Sheets

VARIABLE-SPEED TRANSMISSION

FIELD OF THE INVENTION

The present invention relates to transmissions for converting a rotary input into a rotary output, and in particular to transmissions having continuously, and optionally, self-adjusting gear ratios.

BACKGROUND

Means for generating power, such as electric motors, internal combustion engines, human power, and the like, typically generate power most efficiently when they operate within a relatively narrow range of speeds, while a specific applications for the power might require a broad range of speeds, e.g., a wheeled vehicle. A mechanical transmission is a device interposed between a means for generating power and a specific application for the purpose of adapting the speed and power characteristics of one to the other.

Most mechanical transmissions function as rotary speed changers, where the ratio of the output speed of the transmission to the input speed may be constant, e.g., a gear box, or variable.

A distinction which can be drawn among various variable speed transmissions is that between automatic and manually controlled transmissions. In manual transmissions, the gear ratio is manually changed by the operator, while in automatic transmissions, the gear ratio changes in response to the load on the transmission. Manual transmissions offer the advantage of putting the operator in complete control of the timing and value of the gear ratio selection, however, the shifting process may serve to distract the operator from more pressing aspects of the operation of the machine.

A further distinction which can be drawn among various variable speed drives is that between those drives where the speeds are variable in discrete steps, i.e., stepped transmissions, e.g., a classical bicycle transmission employing a derailer, or those which are continuously variable within a specified range, i.e., stepless drives. Step-variable transmissions usually employ either gears or chains and provide fixed speed ratios with little or no slip. Stepless transmissions use either belts, chains, or rolling contact bodies. Stepped transmissions have a number of important drawbacks: (i) the power source is rarely operating at its optimum speed, (ii) there is a momentary disengagement of the drive as it is shifting between the steps of the transmission which can lead to output power interruptions, and, (iii) there is significant wear on the components of the transmission due to the discontinuous load variation during shifting, particularly when under a heavy load.

A variety of designs exist for continuous stepless transmissions. A widely used and inexpensive stepless drive consists of a V-belt running on variable-diameter pulleys. The sides of the pulleys are conical on the inside to match the taper of the V-belt, and moving them closer together causes the V-belt to move outward from the center of the pulley thereby operating on a larger effective circle, thus changing the speed ratio. Such drives have the drawback of being dependent on friction between the V-belt and the pulley and are therefore subject to power loss due to slippage, i.e., they are not positive-engagement drives.

Stepless transmissions employing rolling contact bodies are known as traction drives. In these transmissions power is transmitted in a variety of ways that depend on the rolling friction of bodies in the form of cylinders, cones, balls, rollers, or disks. Again, because these drives depend on friction to transmit power, they are subject to power loss due to slippage. Furthermore, theses drives tend to be mechanically bulky and therefore not suited to light-duty applications.

For the foregoing reasons, there is a need for a mechanical transmission which (i) is adaptable to both manual and automatic operation, (ii) provides a continuous selection of gear ratios over a specified range, (iii) is not subject to power loss due to slippage, and (iv) is suitable to both heavy and light-duty applications such as motor cycles, winches, bicycles, and other like human-powered vehicles.

SUMMARY

The invention includes, in one aspect, a variable mechanical transmission for use with a frame, for converting a rotary input into a rotary output. The transmission includes a spindle for mounting on the frame allowing for rotation in response to the rotary input, a hub mounted on the spindle for rotation therewith, and a plurality of elongate arms. The arms are each mounted on the hub for pivoting about a pivoting axis paralleling the spindle axis, with the pivoting axes of the arms being arranged about the spindle axis. Each arm carries at its outer end a clutched pinion which rotates in one direction only.

The pinions engage the teeth of a gear which is mounted for rotation about a gear axis paralleling the hub axis. The gear is mountable on the frame for rotation about a gear axis paralleling the spindle axis and also for movement on the frame between concentric and extreme eccentric positions at which the gear axis has a minimal and maximal displacement, respectively, from the hub axis.

Also included in the transmission is shifting structure operable to shift the gear from its concentric toward its extreme eccentric position, and rotary output means coupled to the gear for rotation therewith about the gear axis, for producing a rotary output.

Rotary input to the spindle and consequent rotation of the hub and pivotally attached arms is effective to transmit torque to the gear through the pinions, with movement of the gear from its extreme eccentric toward its concentric positions being effective to reduce the ratio of hub input rotational velocity to output rotational velocity of the rotary output means.

In one general embodiment, the elongate arms are curved to accommodate nesting of the arms, one against another, when the gear is moved away from its concentric position. The arms preferably have a spiral curvature, and there are preferably at least three, evenly arranged about the periphery of the hub.

The gear preferably includes a circular track, and each clutch pinion includes a wheel which rides in this track. The wheel and the track are designed to maintain the associated pinion engaged with the gear teeth, with relative rotation of the hub and gear, and to distribute force applied by the arms on the gear between the cam follower and the track. The gear and associated track may be internal, i.e., engaged internally by the pinions, or external, i.e., engaged externally by the pinions.

The structure mounting the gear on the frame includes, in one embodiment, a wheel on which the gear is mounted for rotation about the gear's axis, and a disc adapted to pivotally mount the wheel on the frame for movement between first and second positions at which the gear is placed at its concentric and extreme eccentric positions. In a second preferred embodiment, the wheel moves translationally on a track between such positions.

The shifting structure includes, in one embodiment, an arm adapted to be mounted on the frame and to engage the wheel, for shifting the latter between its first and second positions. The arm position may be controlled selectively, or may be under the control of a biasing means which acts to urge the wheel toward a selected position, preferably toward its second position.

The shifting structure may further include a damping device adapted to be interposed between the frame and the arm, for retarding the movement of said arm as the arm moves between its first and second positions. The device may include a fluid-filled cylinder and a piston movable within the cylinder, where the piston and cylinder define a fluid passageway which becomes less constricted as the piston moves away from first and second piston positions corresponding to the first and second arm positions.

In one general embodiment, the transmission is used as the drive train of a vehicle, such as a bicycle, wheelchair, motorcycle, or automobile. Here the frame is the vehicle frame, and the rotary output of the transmission is coupled to at least one wheel in the vehicle.

Alternatively, the transmission may be employed in a winch or the like, having a handle and a drum, wherein the rotary input to the transmission is transferred to the handle, and the rotary output is coupled to the drum.

In another aspect, the invention includes a vehicle which includes a transmission of the type just described, and a frame to which the transmission is attached, as indicated above.

These and other objects and features of the invention will become more fully apparent when the following detailed description of the invention is read in conjunction with the accompanying drawings.

DETAILED DESCRIPTION OF THE INVENTION

The variable-speed transmission of the invention is designed to convert a rotary input having a given power, torque, and velocity into a rotary output having about the same power, but different values of torque and velocity. The transmission is suitable for a variety of vehicle and other applications in which a rotary input, such as supplied by pedal input on a bicycle, or a hand-driven crank input, or a motorized rotary input, is to be converted to a rotary output having a desired speed.

The transmission illustrated in the figures herein is designed for use on a bicycle. As such, the transmission serves to vary the relative speed ratios of a pedal crank and a rear-wheel-sprocket, to accommodate differences in bicycle speeds and terrain. Normally, this function is carried out by a derailer system having a pair of derailers, a front derailer which places a drive chain on one of two or more different-size front sprockets, and a rear derailer which is operable to move the chain onto one of typically five different rear sprockets. In the present invention, the same range of gears ratios is achieved, but without chain movement between different sprockets.

Figure 1A:
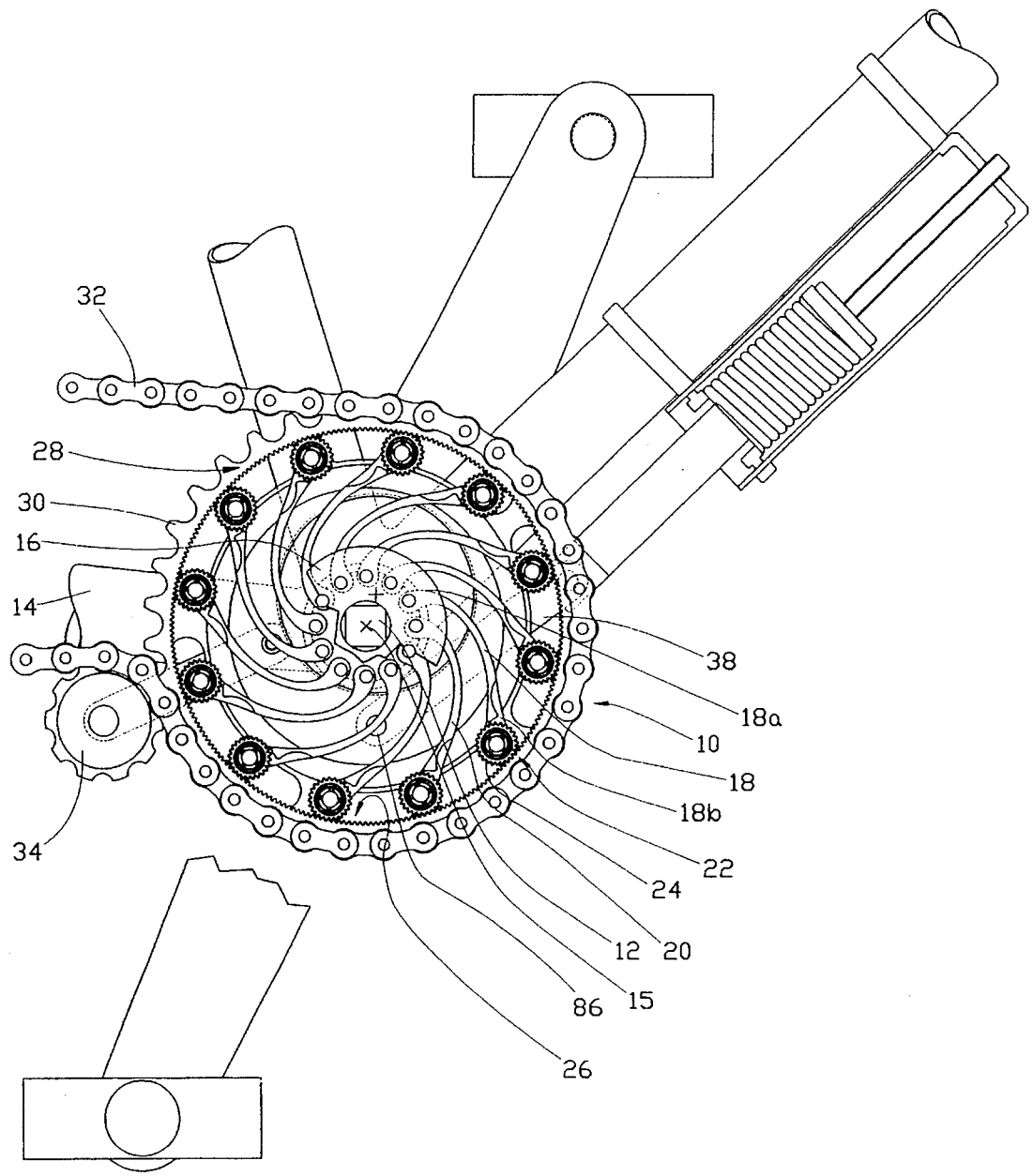
FIGS. 1A and 1B show side views of a transmission constructed in accordance with an embodiment in which the transmission is used as the gear transmission on a bicycle, with the transmission shown with a gear in a concentric position (FIG. 1A), and extreme eccentric position (FIG. 1B).
Figure 1B:
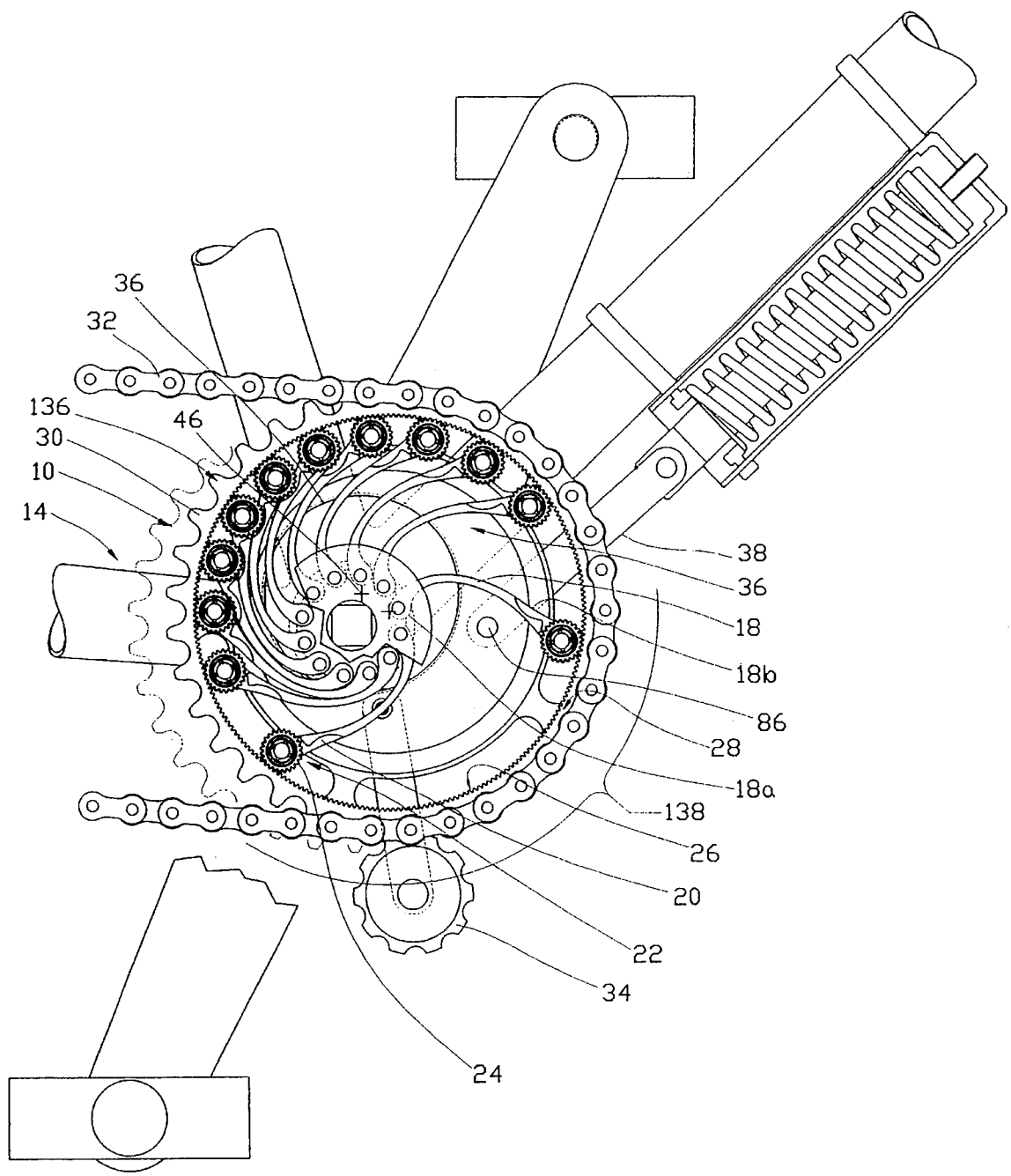

The transmission has two extreme positions, shown in FIGS. 1A and 1B, which define what will be referred to herein as "concentric" and "extreme eccentric" positions of the transmission, respectively. The transmission in its concentric position (FIG. 1A) is in its "lowest" effective gear, defined by a low ratio of rotary output speed to rotary input speed. The transmission in its extreme eccentric condition (FIG. 1B) is in its "highest" effective gear, defined by a high ratio of rotary output speed to rotary input speed.

The highest and lowest gears in the transmission are intended to correspond, for example, to the highest and lowest gears on a conventional 10- or 15-speed bicycle employing a traditional derailer system, respectively. Between the concentric and extreme eccentric positions, the transmission has a continuum of effective gear ratios, corresponding to "intermediate" gears in a conventional derailer-based system, except that the intermediate gears may vary continuously between highest and lowest gears.

With reference particularly to FIG. 1A, the transmission, shown generally at 10, includes a spindle 12 which is rotatably mounted on a frame, in this case, a bicycle frame 14 shown fragmentarily in the figure. Spindle rotation is about a spindle axis 15. The spindle carries a hub 16 for rotation therewith. Arranged about the periphery of the hub is a plurality of curved arms, such as arms 18, 20, which function, in a manner to be described below, to couple the rotary input to the transmission spindle to the rotary output of the transmission. Arm 18, which is representative, has a proximal end 18a at which the arm is pivotally attached to an outer peripheral region of the hub, as shown, and a distal end 18b, which carries a pinion assembly 22.

Details of the arm and attached pinion assembly will be given below with reference to FIG. 4. For present purposes, it is sufficient to note that each pinion assembly, such as assembly 22, has a pinion, such as pinion 24, which engages a gear 26, to transmit torque from the spindle to the arm to the gear, in a manner to be described below. The gear forms part of a gear assembly 28 which also includes a rotary output sprocket 30. As seen in the figure, the sprocket, which is also referred to herein as rotary output means, is coupled by a chain 32 to a rear bicycle sprocket (not shown). In a preferred embodiment, slack in the chain caused by movement of the transmission toward its concentric position, is taken up by an idler 34.

The gear assembly is mounted on the frame by offset disc-and-wheel mounting structure shown generally at 36 in FIG. 1A, and detailed in FIG. 2 below. According to an important feature of the invention, the mounting structure allows movement of the gear assembly between concentric (FIG. 1A) and extreme eccentric (FIG. 1B) positions.

In the embodiment shown in the figures, the gear assembly is biased toward its extreme eccentric position (FIG. 1B) by a biasing arm (seen at 38 in FIG. 2) which is attached to the mounting structure at connector 86. With changes in the relative rotational speeds of the spindle and gear assembly and/or changes in the torque applied to the spindle, the gear assembly can move, against the biasing of arm 38, toward its concentric position and thus to a lower transmission gear ratio, illustrated in FIG. 1A.

Figure 2:
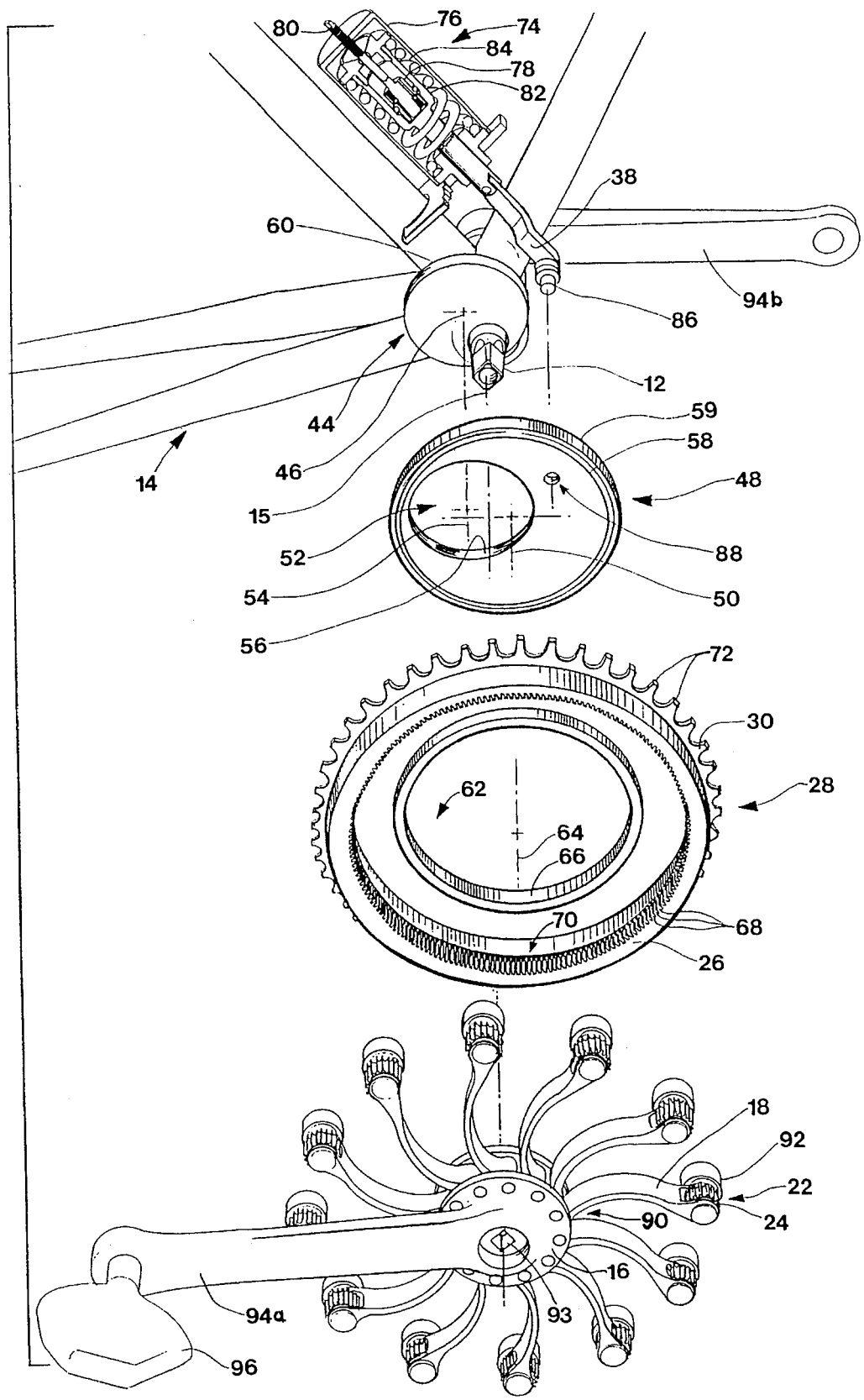
FIG. 2 is an exploded view of the embodiment of the transmission shown in FIGS. 1A and 1B.

FIG. 2 is an exploded view of the transmission of the invention, shown here in combination with bicycle frame 14 as in FIGS. 1A and 1B. As seen in the upper part of the figure, spindle 12 is attached to the frame for rotation about spindle axis 15, according to conventional bicycle construction, e.g., by a bearing mounting. The spindle provides a pair of opposed square bolt ends, such as end 42 having threaded cavities for conventional attachment of a pedal crank arm.

Also attached to the frame, as by welding, is a fixed-position disc 44 having a disc axis 46 parallel to, and offset from, the spindle axis. In the embodiment shown, the disc (and transmission) is carried on the tight side of the frame, with a portion of the spindle projecting rotatably through the disc.

Also shown in the figure are gear assembly 28 and a wheel 48 which mounts the gear assembly on disc 44 for movement between its concentric and extreme concentric positions. Wheel 48 may rotate about wheel axis 50 and an interior circular hole 52 whose axis 54 is coincident with the disk axis. The opening and outer periphery of the wheel define inner and outer bearing-mounting surfaces 56, 58, respectively. The wheel is rotatably mounted on disc 44 between an outer ring surface 60 of the disc and inner ring surface 56 of the wheel, with a threaded surface interposed therebetween (seen at 59 in FIG. 3). Thus mounted, the wheel rotates about disc axis 46, which coincides with axis 54 of opening 52. The disc and wheel form what is referred to above as a disc-and-wheel mounting structure shown generally at 36 in FIGS. 1A, 1B.

Gear assembly 28, shown below wheel 48 in FIG. 2, includes a central opening 62 concentric with gear assembly axis 64 and defining an inner ring surface 66. Concentric with this opening is gear 26 having gear teeth 68 for engaging the pinions. Formed adjacent the gear, and concentric therewith, is a circular track 70 which serves a purpose to be described below. Also formed on the gear assembly is sprocket 30 having sprocket teeth, such as teeth 72.

The gear assembly is rotatably mounted on wheel 48 by a conventional bearing 71 disposed between the wheel's outer ting surface 58 and an inner ring surface 66 of the gear assembly. Thus mounted, the gear assembly rotates about wheel axis 50, which coincides with gear assembly axis 64.

By comparing FIGS. 1A and 1B it can be appreciated how angular movement of wheel 48 about disc axis 46 acts to move the gear assembly mounted on the wheel between its extreme eccentric and concentric positions. In both positions, disc axis 46 is above and to the left of spindle axis 15, these two axes being in a fixed, parallel, offset relationship to one another by the rigid attachment of the disc to the frame (FIG. 2). In the concentric position, shown in FIG. 1A, the wheel is in a first position that places gear axis 64 substantially coincident with spindle axis 15. As the wheel pivots counterclockwise about axis 15 in the figure, away from its concentric position, the axis of the gear assembly is moved away from spindle axis 15, until the wheel is in a second position (FIG. 1B) that places the gear assembly in its extreme eccentric position. The wheel executes about a sixth turn (60 degree pivoting) between these first and second positions.

It will be appreciated from the foregoing that disc 44 and wheel 48 function as mounting means for mounting the gear assembly on a frame, e.g., a bicycle frame, for rotation about a gear axis paralleling the spindle axis, and for movement with respect to the frame between concentric and extreme eccentric positions at which the gear axis has a minimal and maximal displacement, respectively, from the spindle axis.

In the embodiment illustrated herein, the wheel is biased toward its second position (at which the gear assembly is its extreme eccentric position) by a biasing device 74 mounted on the bicycle frame, as shown. In a preferred embodiment, the device includes a housing 76 having an internal piston 78 held in a fixed position in the housing by an adjustable-position screw 80, which forms an extension of the piston, screw 80 serving to adjustably pre-load the biasing device. A cylinder 82 in the assembly, attached to arm 38, reciprocates on the piston, to move arm 38 between extended and retracted reciprocal positions. The cylinder is biased toward its retracted position, shown in FIG. 2, by a coil spring 84. A biasing device that further includes a damping mechanism for retarding the movement of the cylinder near the two extreme cylinder positions will be described below with respect to FIG. 7.

Arm 38 is coupled to wheel 48 by a connector 86 slidably received through a hole 88 in the wheel and attached to the distal end of the arm. With the arm in its fully retracted position, under the biasing of spring 84, the wheel is held in its second position (FIG. 1B) corresponding to the extreme eccentric position of the gear assembly. As the arm is moved toward its fully extended position, wheel 48 is moved clockwise in FIG. 1B, shifting the gear assembly toward its concentric position. At the fully extended position, the gear assembly is in its concentric position.

The biasing device just described is also referred to herein as means operable to shift the mounting means, i.e., the disc-and-wheel structure in the transmission, between its first and second positions, for shifting the gear assembly between its concentric and extreme eccentric positions, respectively. In the embodiment described above, the shifting means acts to bias the mounting means toward its second position, with movement toward the first position occurring as the result of mechanical forces acting on the transmission during operation. In this mode, the transmission is automatically placed at an appropriate effective gear ratio determined by the relative speeds of the rotary input and output, and the torque applied at the rotary input.

Alternatively, the shifting means may be a manually-selectable type assembly in which the position of a shifting arm, such as arm 38 in biasing device 74, is selected by the user, thereby placing the assembly in a selected arm position, corresponding to a desired gear ranging from the "lowest" (concentric-position) gear, to the "highest" (extreme eccentric) gear.

Completing the description of what is shown in FIG. 2, a hub assembly 90 in the transmission includes above-described hub 16 on which are pivotally mounted a plurality of arms, such as arm 18, each carrying a distal-end pinion assembly, such as assembly 22. The pivotal mounting of the arms on the hub will be described below with respect to FIGS. 3 and 4. The assembly has a square receptacle 93 which is received on spindle end 42 in the assembled transmission.

Each arm in the hub assembly has a spiral curvature, seen best in FIGS. 1A and 1B, which allow the arms to nest together at one side of the transmission, when the gear assembly moves toward an eccentric position, as seen in FIG. 1B. In the embodiment shown, the assembly includes 12 such arms, each positioned at substantially evenly spaced positions about the hub, i.e., at regular 30 degree intervals. More generally, the hub assembly preferably includes at least three arms, preferably evenly spaced about a hub.

Assembly 22, which is representative, includes the above-mentioned clutched pinion 24 which engages gear 26, and an associated cam follower 92 which rides in track 70 of the gear assembly. Details of the assembly will be given in FIG. 4. The wheel in each assembly functions, as the hub assembly rotates relative to the gear assembly and the wheel travels in contact with track 70, to maintain proper alignment of the associated pinion with the gear, and at the same time, prevent the pinion teeth from being pushed radially into the gear teeth. That is, the wheel acts to distribute forces, particularly radial forces, applied by the hub assembly arms to the contact region between the wheel and track, rather than between the pinion and gear, thus reducing wear on the meshing gear teeth.

Also included in the hub assembly are crank 94a attached to the hub, and a pedal 96 carried at the distal end of the crank. The crank and pedal provide one of two pedal-driven cranks in the bicycle for applying a rotary input to the transmission, the other crank 94b being attached conventionally to the other side of the spindle, 180 degrees ahead of the first.

To assemble the transmission, wheel 48 is rotatably mounted on disc 44, as above, with the distal end of arm 38 coupled to wheel 48 at threaded opening 80. The gear assembly is rotatably mounted on wheel 48, as above. Finally, the hub assembly is attached to the spindle by placing hub receptacle 93 on spindle end 42, and securing the hub on the spindle with a mounting bolt (indicated at 98 in FIG. 3). As the hub assembly is placed on the spindle, the assembly arms are also positioned within the gear assembly to place the cam followers in track 70, and the pinions into engagement with the gear 26.

Figure 3:
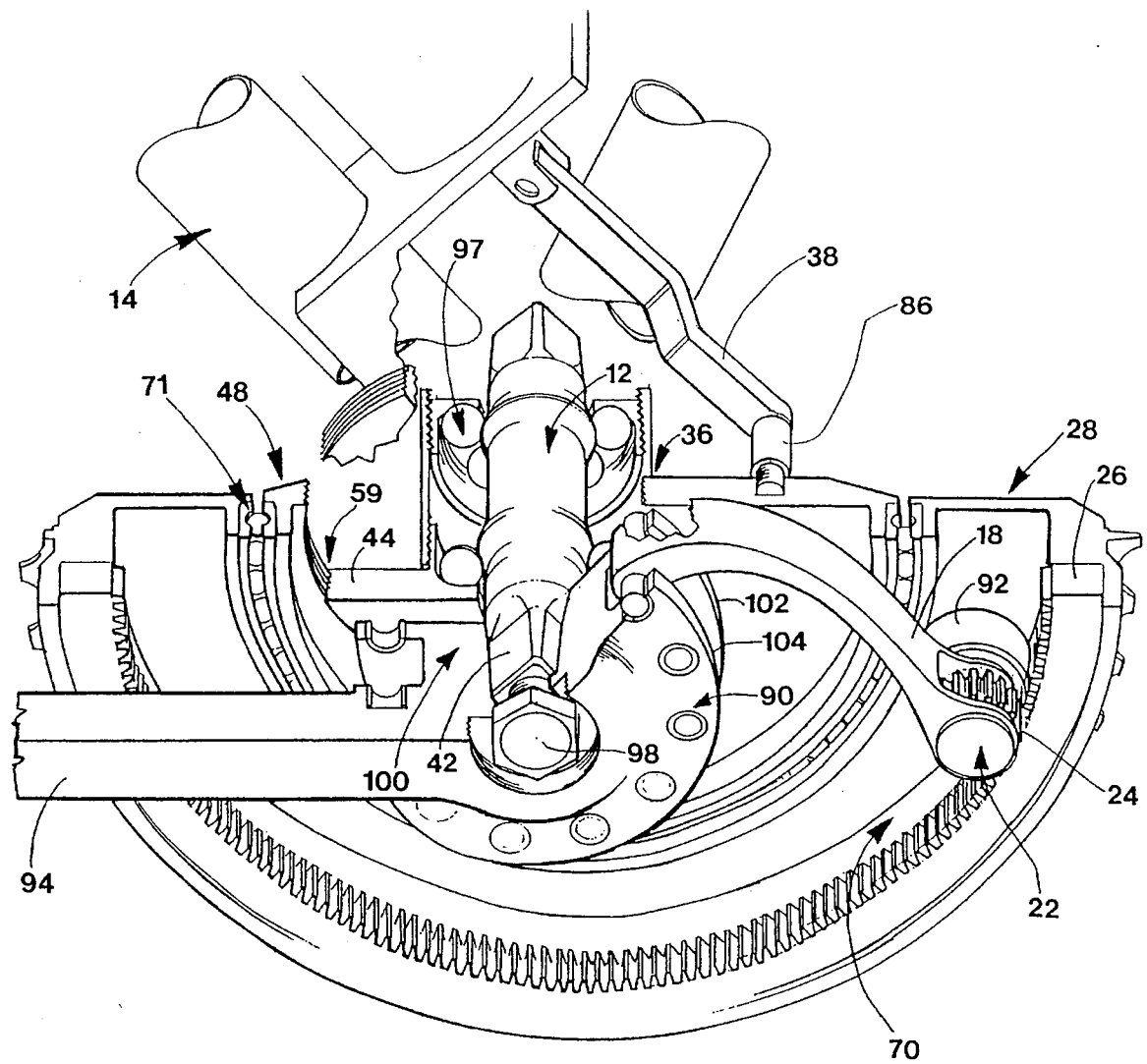
FIG. 3 is an enlarged cutaway view of a portion of the transmission.

FIG. 3 shows an enlarged cutaway portion of the assembled transmission, showing spindle 12, a ball bearing 97 rotatably mounting the spindle in bicycle frame 14, disc 44 rigidly mounted on the frame, wheel 48 rotatably mounted on disc 44, and gear assembly 28 rotatably mounted on wheel 48 by a ball bearing 71. Also shown is a portion of hub assembly 90, with an arm 18 in the assembly shown with its pinion assembly 22 engaged with the gear.

As seen in the figure, the hub in the hub assembly is a unitary piece which includes crank 94, a solid annular portion 100, and a pair or annular walls 102, 104 between which the assembly arms are mounted, as detailed in FIG. 4 below.

The figure also shows the internal engagement of pinion assembly 22 of arm 18 with the gear and adjacent track 70. By internal engagement is meant that the pinions and associated wheels engage the gear and track, respectively, at the outermost diameter region of the pinions and associated wheels. It can be seen in FIG. 3 how a cam follower, such as wheel 92, functions to "track" the gear, to hold the pinion assembly at a position of stable engagement with the gear, and to distribute radial forces therebetween.

Figure 4:
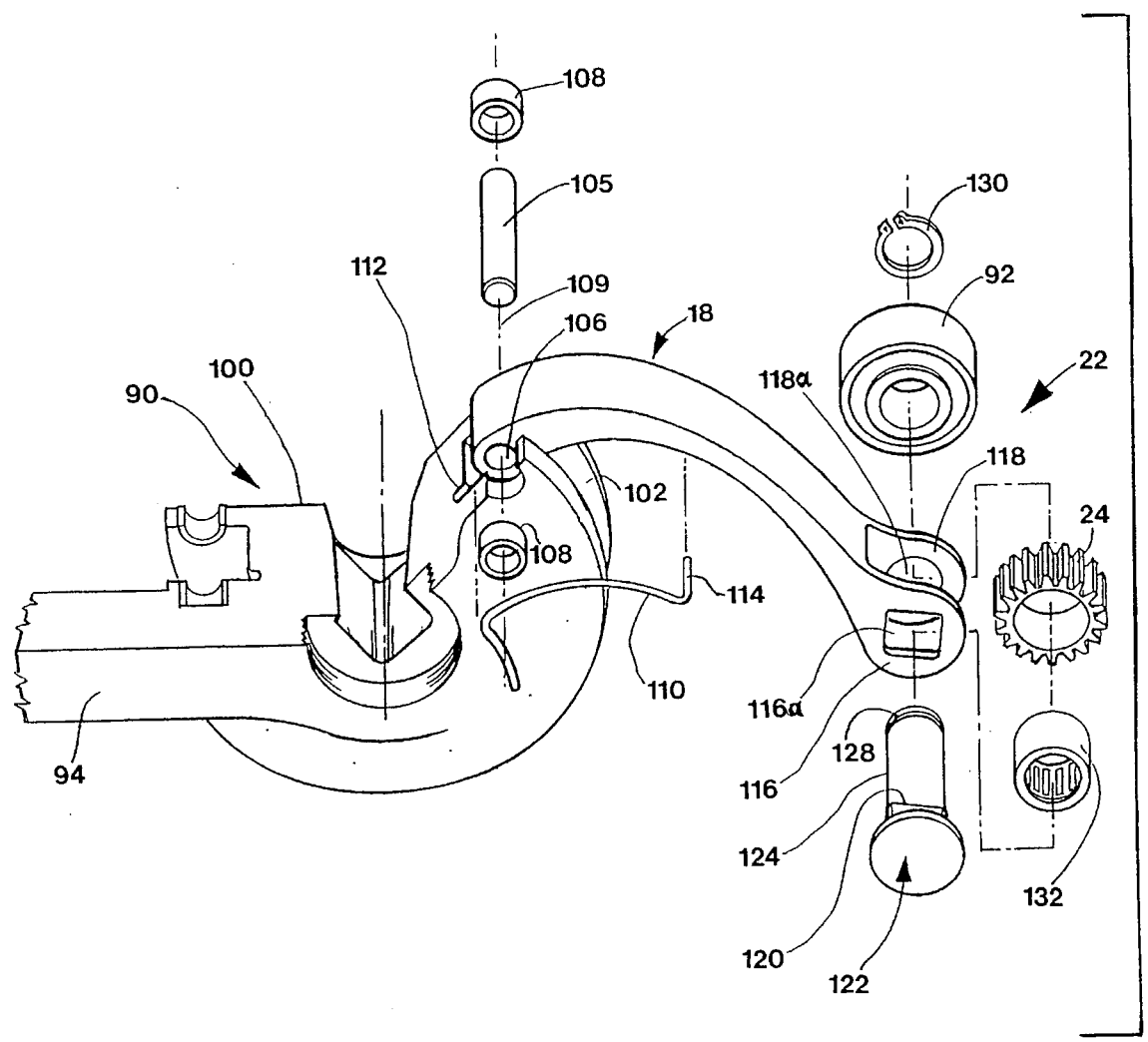
FIG. 4 is an exploded view of an arm and pinion assembly in the transmission.

FIG. 4 is an exploded view of hub assembly 22, showing the pivotal attachment of arm 18 to the hub, and the construction of pinion assembly 22 carried on the arm. As seen, arm 18 is mounted on the hub by means of a pivot pin 105 received through a cylindrical opening 106 in the proximal end of the arm, and secured on either side of the arm by locking sleeves, such as sleeve 108, for pivoting movement about the pin axis, indicated at 109.

In a preferred embodiment, an arm spring 110 having an end portion received in a slot 112 in the hub, engages the arm at a distal spring end 114, to bias the arm in a radially outward position. The remaining arms in the hub assembly are similarly mounted on the hub for pivoting movement about the associated pin axis.

Pinion assembly 22 is mounted on a pair of brackets 116, 118 formed at the distal end of arm 18. As shown, bracket 116 has a square opening 116a for receiving a short square neck 120 of a axle bolt 122, and bracket 118 has a round opening 118a for receiving a rod portion 124 therein. The end of the bolt is grooved at 128 for receiving a retaining ring 130.

The clutched pinion in the assembly includes a one-way clutch 132 carried on the rod portion of bolt 122, between brackets 116, 118. The one-way clutch is designed conventionally, e.g., a Sprag clutch, to rotate in one direction only, in particular, in a clockwise direction in the figure, as indicated. A pinion 24, also located between the two arm brackets, is carried on the one-way clutch for rotation therewith.

Also carried on the bolt, but outside the arm brackets, is a cam follower 92 which fits snugly over the bolt rod portion.

Figure 5:
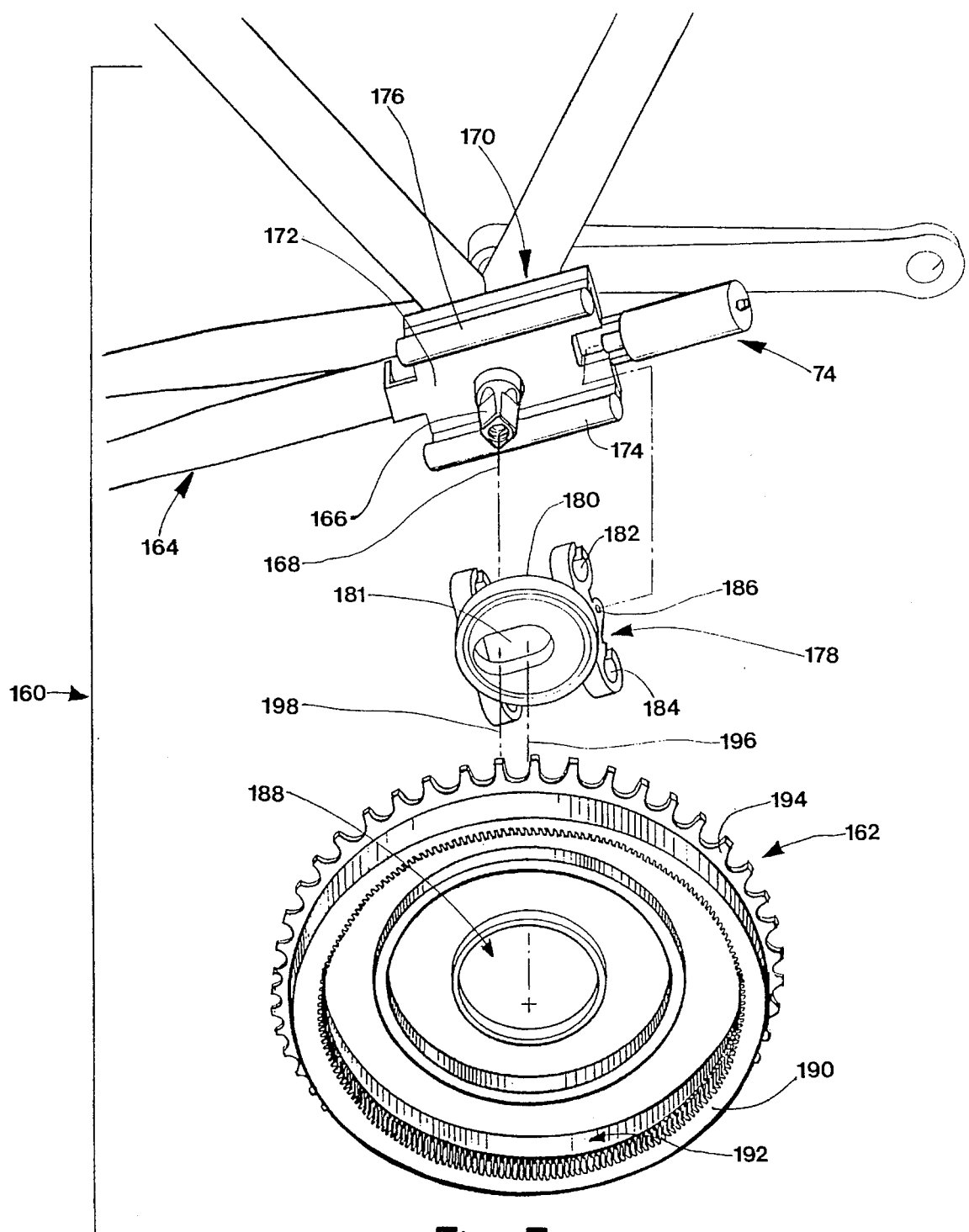
FIG. 5 is a view like FIG. 2, but showing an embodiment of the transmission having a different type of gear mounting.

Other embodiments of the invention are described below with respect to FIGS. 5–7. However, before describing these, it is useful to consider the operation of the transmission as just described, as it functions as a variable-speed bicycle transmission. Particular reference is made to FIGS. 1A, 1B, and 8.

In operation, the effective gear ratio of the transmission is determined by the ratio of the rotational velocity of the hub 16 about the spindle axis 15 to the gear rotational velocity about the gear axis 64; as this ratio increases, so does the effective gear ratio. The particular value of the gear ratio is determined by a complicated function relating the diameter of the hub 16, the diameter of the gear 26, and the degree of eccentricity of the spindle axis with respect to the gear axis. The interplay among these variables results in a strong angular dependence of the velocity of the pinion relative to the velocity of the gear, both velocities measured about the gear axis. It is this angularly dependent difference in relative velocities which forms the basis of operation of the transmission.

Figure 8:
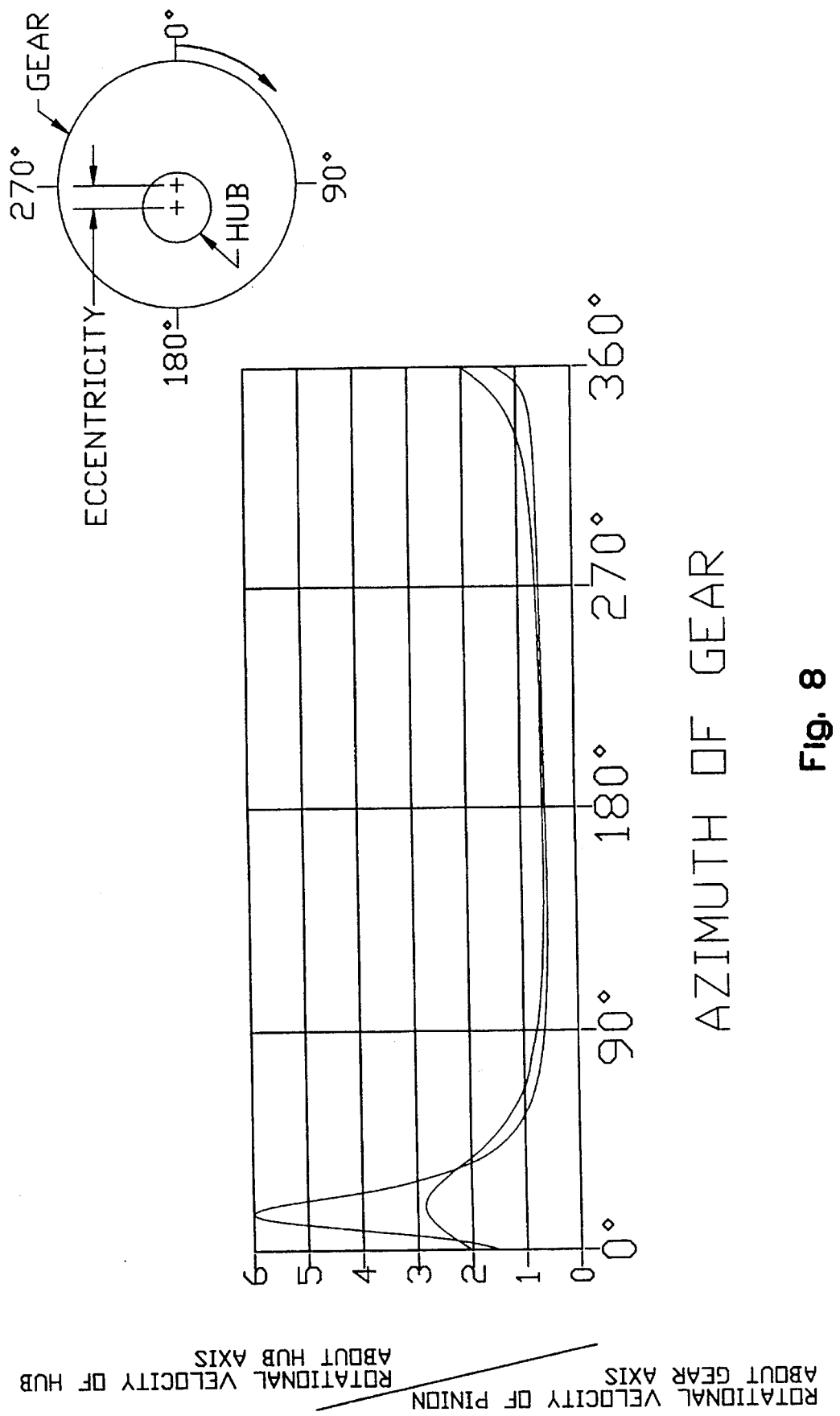
FIGS. 8 shows a plot of the ratio of the angular velocity of the pinion about the gear axis to the angular velocity of the hub about the hub axis.

FIG. 8 shows a plot of the ratio of the rotational velocity of the pinion about the gear axis to the rotational velocity of the hub about the hub axis as a function of angular displacement of the gear about the gear axis. Curves are presented for three values of the eccentricity; extreme eccentric, intermediate eccentric and concentric. Note that as the degree of eccentricity decreases, so does the maximum ratio of rotational velocities, until, in the concentric condition, the ratio is constant at a value of 1.0.

In operation, the transmission can be viewed as having two zones, an "idling" zone and an "engagement" zone, each zone being defined by the relative velocity of the pinion the gear. In FIG. 1B, the engagement zone is indicated by the heavy arrow superimposed on the periphery of the gear assembly starting at approximately the 3 o'clock position and ending at the 6 o'clock position, and the idling zone consists of the remaining portion of the periphery. (For the purposes of this discussion, it will be assumed that the degree of eccentricity is held constant.)

In the idling zone, the velocity of the pinion is less than that of the gear causing the pinion to free-wheel in a clockwise direction in response to the clockwise rotation of the gear. In the idling zone, because the gear is freewheeling, no torque is transmitted from the hub to the gear.

As the pinion approaches the engagement zone its velocity increases, until, at the entrance of the engagement zone, the velocity of the pinion matches the velocity of the gear. When the pinion velocity matches the gear velocity, the clutches of the pinion become engaged causing the pinion to stop rotating and become engaged with the gear. Only while the pinion is in the spread zone and engaged with the gear torque is torque transmitted from the hub to the gear and then to the output sprocket 30.

Up to this point we have assumed that the extent of eccentricity of the spindle axis 15 with respect to the gear axis 64 is fixed. Now we will address how, in the automatic embodiment of the invention, the eccentricity is varied. Initially, in the absence of input applied to the transmission, the gear assembly is biased to its extreme eccentric condition by a biasing device, as shown in FIG. 1B. When a person first begins pedaling the bicycle, rotary movement is applied to the spindle in a clockwise direction in the figure, causing the hub assembly to rotate also in a clockwise direction about the spindle axis. The rotary movement of hub in turn causes rotary movement of the output sprocket, as described above. As the output sprocket begins to rotate, tension is developed in the chain, causing the wheel 48 to rotate about the disk 44, thereby changing the eccentricity of the spindle axis with respect to the gear axis.

Although the transmission of the invention has been described in considerable detail with reference to certain preferred versions thereof, other versions are possible. Those skilled in the art of mechanical design will understand that there are many possible variations of the transmission that fall within the perview of the present invention. Several of these alternative versions will be described below.

In the transmission just described, the gear assembly is mounted on a pivoting wheel for movement between its concentric and extreme eccentric positions. FIG. 5 shows components of a transmission 160 constructed according to a second embodiment of the invention. The transmission differs from transmission 10 primarily in the mounting means or structure used in mounting the transmission gear assembly, here shown at 162, on a frame, such as bicycle frame 164. In this embodiment, in contrast to transmission 10, the gear assembly is moved translationally rather than rotationally between first and second positions, to place the gear assembly at concentric and extreme eccentric positions, respectively, rather than by a pivoting movement of a wheel on a disc, as in transmission 10.

The figure shows a spindle 166 mounted on the frame for rotation about a spindle axis 168 which is fixed with respect to the frame. A rail support 170 in the transmission is mounted rigidly on the frame, as shown, with a support plate 172 receiving one end of the spindle therethrough, and lying in a plane substantially normal to the spindle axis. The plate carries a pair of parallel rails 174, 176.

Carried on the rail support, for movement along the rails, is a wheel carriage assembly 178 having a carriage 179 supporting a wheel 180 having an obround slot 181 formed therein, and through which the spindle projects in the assembled transmission. The slot may be thought of as defining right- and left-end circles having respective axes 196, 198, the right axis corresponding to the center axis of wheel 178.

The wheel carriage assembly is attached to two pairs of bushings, such as pairs 182, 184. These bushing ride on rails 174, 176, for movement of the carriage translationally between a first and second positions, at which the spindle abuts the left and right sides of slot 181, respectively. With the wheel in its first position, the wheel axis (which coincides with the right-end slot axis) coincides with the spindle axis. With the wheel in its second position, the spindle axis coincides with the left-end slot axis, now offset from the wheel axis. These first and second positions of the wheel correspond to concentric and extreme eccentric positions of the gear assembly in the transmission.

The wheel carriage assembly further includes an opening 186 through which the biasing arm of a biasing assembly, such as an arm 38 in device 74 in FIG. 2, is connected to the wheel, to bias the wheel toward its second position. The biasing device 74 also forms part of the transmission, and is also referred to herein as means for shifting the gear assembly between its concentric and extreme eccentric positions.

Gear assembly 162 is substantially like assembly 28 in transmission 10, but has a smaller central opening 188 dimensioned for rotatable mounting of the assembly on wheel 180. Briefly, the gear assembly includes an internal gear 190, an adjacent annular track 192 for guiding the transmission cam followers, as described above, and a sprocket 194 which serves-as the rotary output of the transmission. The gear assembly is mounted on the wheel by a ball bearing (not shown) interposed between the outer ring surface of the wheel and the inner ring surface of opening.

Also included in the transmission, but not shown here, is a hub assembly, like assembly 90 in FIG. 2, having a hub coupled to the spindle, and a plurality of arms pivotally carried on the hub and having distal-end pinion assemblies which engage the gear assembly through the gear as described above.

In operation, the biasing assembly in the transmission biases the wheel carriage assembly toward its second position, offsetting the gear-assembly axis to the right of the spindle axis, placing the gear assembly in an extreme eccentric position like that shown for transmission 10 in FIG. 1B. Movement of the wheel carriage toward the left in FIG. 5, for example, in response to differential rotary input and output speeds, then moves the gear assembly toward a concentric position, according to the mechanical principles described above.

Figure 6:
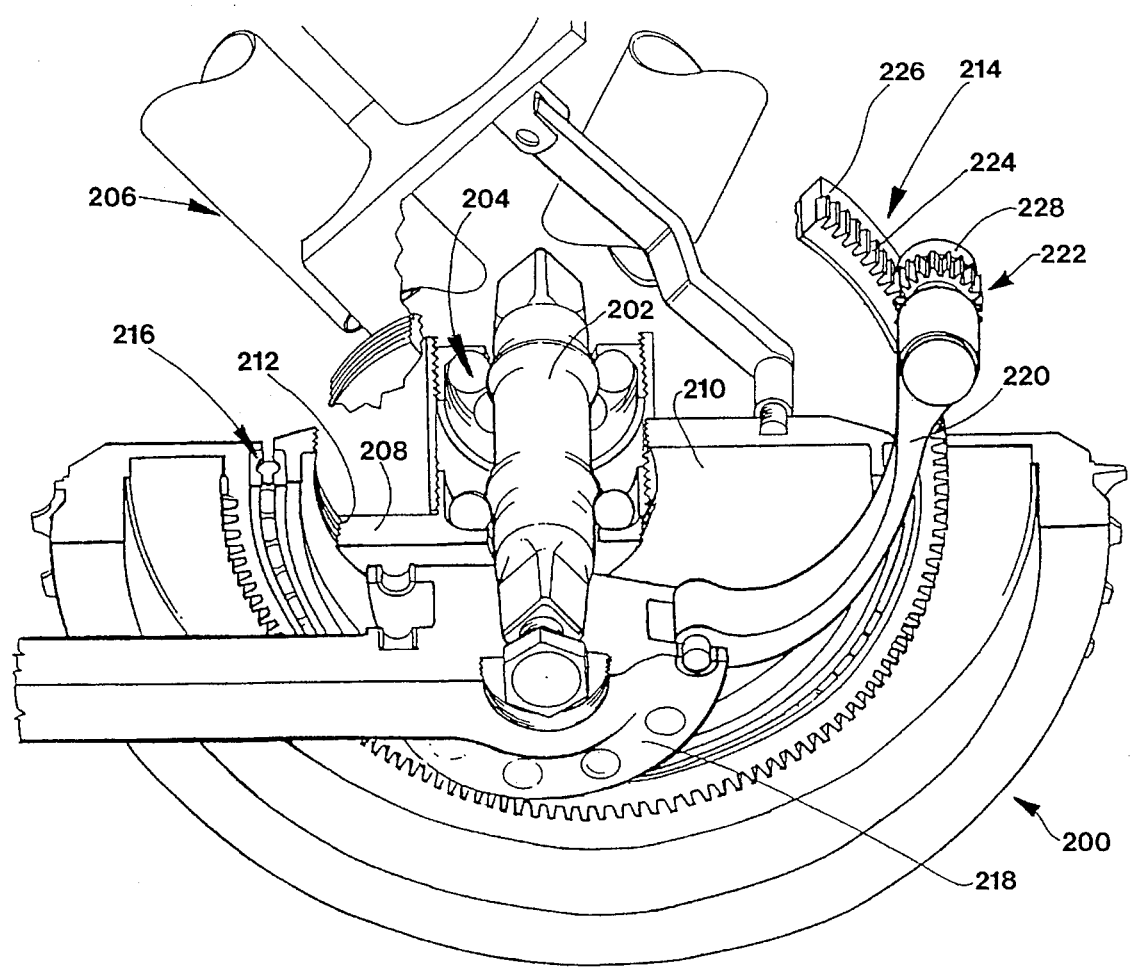
FIG. 6 is a view like FIG. 3, but showing an embodiment of the transmission having a different type of gear and track.

FIG. 6 shows a cutaway view like that in FIG. 3, but showing another embodiment of a transmission 200 constructed according to the invention. Shown here are a spindle 202, a ball bearing 204 rotatably mounting the spindle in a bicycle frame 206, a disc 208 rigidly mounted on the frame, a wheel 210 rotatably mounted on disc 208, by a threaded junction 212, and gear assembly 214 rotatably mounted on wheel 210 by a ball bearing 216. Also shown is a portion of hub assembly 218, with an arm 220 in the assembly shown with its pinion assembly, indicated at 222, engaged with the gear.

The gear assembly in this embodiment differs from assembly 28 above in that its gear, indicated at 224, is an external gear, i.e., one which is engaged by the hub assembly pinions externally, as shown. The assembly also includes an external circular track 226 adjacent the gear for guiding the motion of the pinion assemblies, through the movement of cam followers, such as cam follower 228. By external engagement is meant that the pinions and associated cam followers engage the gear and track, respectively, at the innermost diameter region of the pinions and associated cam followers.

In still another embodiment, which may apply to any of the transmissions discussed above, the biasing means, or device used to bias the transmission gear assembly toward its extreme eccentric position, may further include structure for damping the movement of the biasing arm toward and away from its extreme positions. The purpose of the damping structure is to prevent rapid changes in the eccentricity of the transmission in response to rapid load changes on the rotary input, as would occur, for example, during a normal peddling cycling or when a bicycle rider stops pedaling momentarily.

Figure 7:
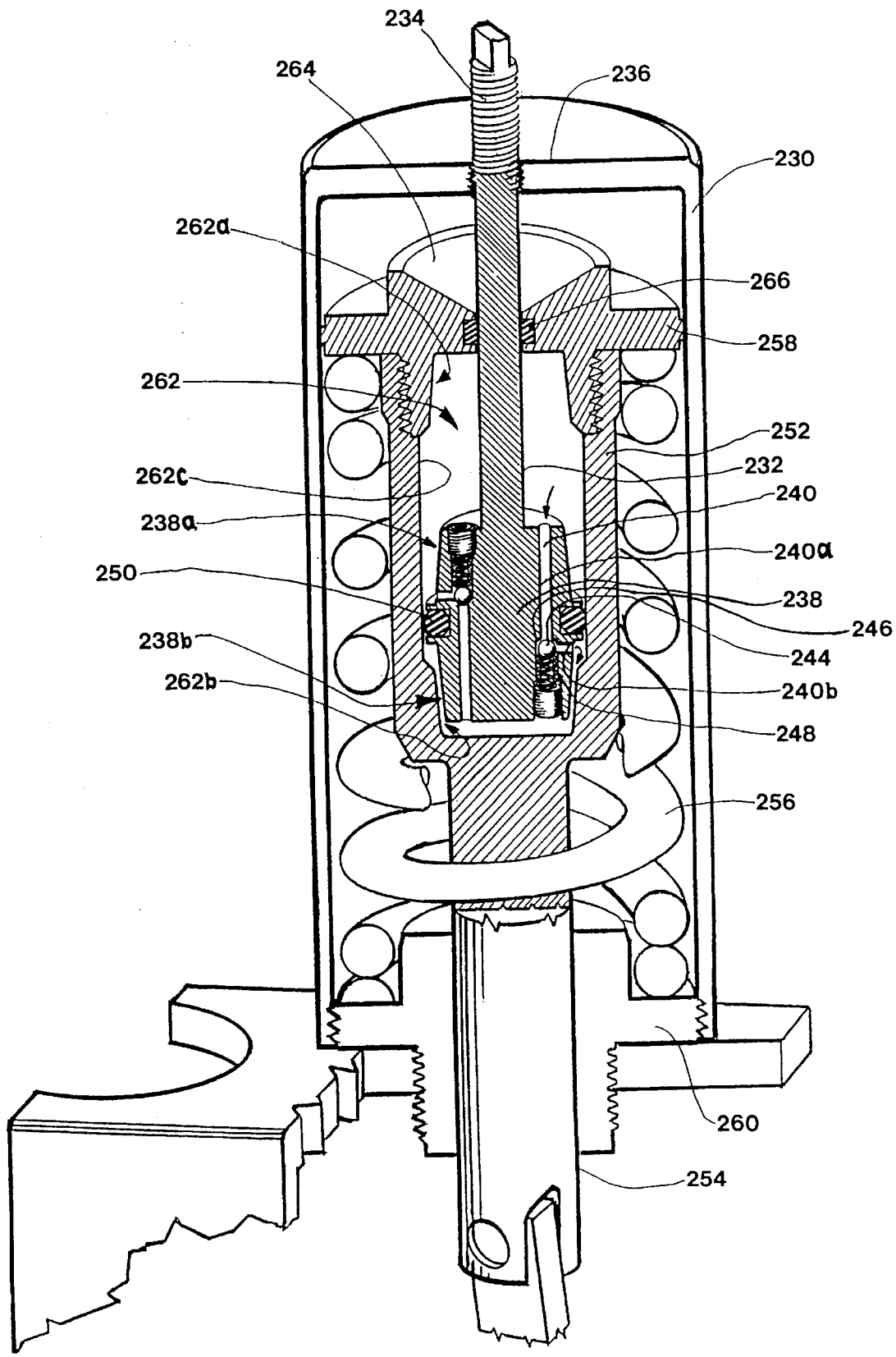
FIG. 7 is an enlarged cross-sectional view of damping and biasing structure employed in the transmission.

FIG. 7 shows the combined biasing device and damping means includes a cylindrical housing 230, and contained therein a piston 232 disposed at a fixed position in the housing set by an adjustment screw 234 engaging a top 236 of the housing. The lower end of the piston has a piston head 238 which forms an important element of the damping structure in the device. As can be seen, the head has a barrel-like shape in which upper and lower surface portions of the piston head, indicated generally at 238a and 238b, taper away from a center region of the piston.

Formed in the piston head are two flow channels 240, 242. Channel 240 has an axial conduit 240a communicating with an upper head surface and a radial conduit 240b that communicates with a side region of the piston head. The channel is valved by a valve ball 244 that is pressed against a valve seat 246 formed at the intersection of the conduits forming the channel, by a spring 248. As can be appreciated, the ball valve acts as a one-way valve, allowing fluid flow from conduit 240a to 240b, but not in the opposite direction.

Channel 242 is similarly formed, but to function as a one-way ball valve to allow fluid flow from a bottom to side direction, but not in the opposite direction.

Also forming part of the piston head is an O-ring seal 250 held in an annular channel formed in the center of the piston head.

As in above-described biasing device 90, this device also includes a cylinder 252 held within the housing for movement between extended and retracted positions, for moving a biasing arm 254 attached to the cylinder also between such extended and retracted positions. As will be recalled, these positions correspond to the first and second positions, respectively, of the gear assemblies described above. The cylinder is biased toward its retracted position, as in device 90, by a coil spring 256 interposed between an upper cylinder lip 258 and a lower housing lip 260.

According to an important feature of the invention, the cylinder defines an internal cavity 262 formed by tapered end regions 262a, 262b, and a generally cylindrical central wall portion 262c. As can be seen, the central wall portion is dimensioned to allow sealed sliding movement of the piston within the cylinder, and the upper and lower end portions are tapered to receive the corresponding tapered portions of the piston, with a small gap therebetween. This gap forms part of a variable-length fluid passageway through which liquid in the cavity moves from one side of the piston to another, as the cavity moves in relation to the piston, and when the piston head is received in the associated tapered end region. More specifically, as the piston head is received further in a tapered cavity region, the annular gap therebetween increases in axial dimension, producing a greater flow resistance in the passageway.

The cylinder has a cap 264 which can be removed to fill the cavity with a damping fluid, such as silicone oil, and which also has an annular seal 266 for accommodating sealed movement of piston 232 relative to the cylinder.

It is useful to consider the operation of the combined biasing and damping means as just described. Particular reference is made to FIGS. 1A, 1B, and 7.

Initially, the biasing arm 254 is biased towards its fully retracted position (as seen in FIG. 7) by the spring 248, this retracted position corresponding to the extreme eccentric condition of the transmission shown in FIG. 1B. As the rider begins to pedal the bicycle, as described above, the chain tension causes the gear assembly 28, including the wheel 48, to rotate about the disk 44 in a clockwise direction. The rotation of the wheel causes a displacement of the biasing arm connector 86, pulling the biasing arm down in FIG. 7, leading to a downward displacement of the internal cavity 262 with respect to the piston 232.

To accommodate the downward motion of the cavity relative to the piston, a portion of the damping fluid is forced from the top region of the cavity above the piston head to the bottom region of the cavity below the piston head. The flow of damping fluid is accommodated by a flow path comprising flow channel 240 and the variable-length fluid passageway formed between the tapered region of the piston head 238 and the tapered region of the cavity 262. As the cavity moves farther away from the bottom of the piston, the length of the variable-length fluid passageway is shortened, thereby reducing the overall flow resistance between the top and bottom regions of the cavity. It is this reduction in flow resistance which is responsible for the variable damping feature of this aspect of the invention; as the piston moves farther from the bottom of the cavity, the amount of damping decreases.

Once the lower piston head 238 passes out of the tapered portion of the cavity, the degree of damping is constant, being determined solely by the flow resistance of channel 240.

The same damping mechanism is applied when the biasing arm is displaced from its fully extended position, however, in this case, fluid flow is through channel 242.

It is claimed:

1. A variable-speed mechanical transmission for use with a human powered device, for converting a human powered rotary input into a rotary output, comprising:

a frame;

a spindle rotatably mounted on the frame, for rotation in response to such human powered rotary input, the spindle having a spindle axis;

a hub mounted on the spindle for rotation therewith, the hub having a hub axis;

a plurality of elongate arms having proximal and distal ends, each of said arms being mounted adjacent said proximal end on said hub for pivoting about a pivoting axis paralleling the spindle axis, the pivoting axes mounting the arms to the hub being arranged about the spindle axis, the elongate arms being curved to accommodate nesting of the arms, one against another;

a clutched pinion mounted on each arm, adjacent the distal end thereof, for rotation in one direction only, said clutched pinion having a pinion axis and a cam follower which rotates about a cam follower axis, such axis being coaxial with the pinion axis;

a gear mounted for rotation about a gear axis paralleling the hub axis, said gear having teeth engaged by said pinions and a circular track for receiving said cam follower;

means adapted to mount the gear on said frame for rotation about a gear axis paralleling said spindle axis and for movement thereon between concentric and extreme eccentric positions at which the gear axis has a minimal and maximal displacement, respectively, from the hub axis;

shifting means operable to shift said mounting means from said concentric toward said extreme eccentric position; and rotary output means coupled to said gear for rotation therewith about the gear axis, for producing such rotary output, wherein the human powered rotary input to said spindle and consequent rotation of said hub and pivotally attached arms is effective to transmit torque to said gear through said pinions, with movement of the mounting means from said extreme eccentric toward said concentric positions being effective to reduce the ratio of hub output rotational velocity to input rotational velocity of the rotary output means.

2. The transmission of claim 1, wherein the arms have a spiral curvature.

3. The transmission of claim 1, which includes at least three arms.

4. The transmission of claim 3, wherein the arms are evenly spaced around the periphery of the hub.

5. The transmission of claim 1, wherein the arms are mounted, at their proximal ends, at substantially evenly spaced positions about the periphery of the hub.

6. The transmission of claim 1, wherein each arm has an arm spring which engages the arm to bias the arm in a radially outward position.

7. The transmission of claim 6, wherein the gear is an internal gear, and said track is an internal track concentric with the gear.

8. The transmission of claim 6, wherein the gear is an external gear, and said track is an external track concentric with the gear.

9. The transmission of claim 1, wherein said means adapted to mount the gear on said frame includes a wheel on which the gear is mounted for rotation about the gear axis, and said shifting means is connected to said wheel for shifting the same between said first and second positions.

10. The transmission of claim 9, wherein said means adapted to mount the gear on said frame mounts said wheel on said frame for pivoting about an axis that is parallel to and offset from said gear axis, between said first and second positions.

11. The transmission of claim 10, wherein said mounting structure includes a disc adapted to be mounted on said frame, substantially normal to the spindle axis, and said wheel is mounted on said disc for rotation about a disc axis which is offset from the gear axis.

12. The transmission of claim 9, wherein said means adapted to mount the gear on said frame mounts the wheel on said frame for translation between said first and second positions.

13. The transmission of claim 9, wherein said shifting means includes an arm to engage said wheel, for shifting said wheel between its first and second positions.

14. The transmission of claim 13, wherein said wheel is adapted to be mounted on the frame for pivoting about an axis that is parallel to and offset from said gear axis, between such first and second positions, and movement of the arm is effective to cause pivoting of said wheel about said pivoting axis.

15. The transmission of claim 13, wherein said means adapted to mount the gear on said frame is adapted to mount the wheel on said frame for translation between said first and second positions.

16. The transmission of claim 15, which further includes a manual control switch for controlling the position of the arm between said first and second positions.

17. The transmission of claim 13, wherein the shifting means includes biasing means for biasing said arm in a position that urges the wheel toward its second position, thereby urging the gear toward its extreme eccentric position, in opposition to the tendency of rotary input applied to the spindle to effect movement of the wheel toward its first position.

18. The transmission of claim 17, wherein the shifting means further includes damping means adapted to be interposed between such frame and said arm, for retarding the movement of said arm as the arm moves between a first and a second arm position, said first and second arm positions corresponding to the first and second positions of the wheel.

19. The transmission of claim 18, wherein the damping means includes a fluid-filled cylinder having tapered end regions and a piston movable within the cylinder, said piston and cylinder defining a fluid passageway which becomes more constricted as the piston moves towards the tapered end regions.

20. The transmission of claim 19, wherein the fluid-filled cylinder is attached to said arm, said piston is adapted to be attached to said frame, and said biasing means in the transmission acts to bias said cylinder toward a second position corresponding to said second position of said arm.

* * * * *